United States Patent
Hansen et al.

(10) Patent No.: US 6,548,005 B2
(45) Date of Patent: Apr. 15, 2003

(54) MULTIPLE APPLIQUE PROCESS FOR INJECTION MOLDING ARTICLES

(75) Inventors: Victor D. Hansen, Rockford, MI (US); Aron I. Palmer, Lakeview, MI (US); Eric L. Seath, Howard City, MI (US)

(73) Assignee: Display Pack, Inc., Grand Rapids, MI (US)

(*) Notice: Subject to any disclaimer, the term of this patent is extended or adjusted under 35 U.S.C. 154(b) by 130 days.

(21) Appl. No.: 09/822,757

(22) Filed: Mar. 30, 2001

(65) Prior Publication Data

US 2002/0142127 A1 Oct. 3, 2002

(51) Int. Cl.[7] .......................... B29C 45/14; B29C 45/16
(52) U.S. Cl. ...................... 264/263; 264/266; 264/277
(58) Field of Search .............................. 264/250, 254, 264/255, 261, 263, 265, 266, 271.1, 275, 277

(56) References Cited

U.S. PATENT DOCUMENTS

| | | | | |
|---|---|---|---|---|
| 4,323,406 A | * | 4/1982 | Morello | 156/212 |
| 4,810,452 A | * | 3/1989 | Taillefert et al. | 264/247 |
| 5,304,273 A | * | 4/1994 | Kenrick et al. | 156/219 |
| 5,401,449 A | * | 3/1995 | Hill et al. | 156/245 |
| 5,743,984 A | * | 4/1998 | Gregory et al. | 156/242 |
| 5,759,464 A | * | 6/1998 | Matsumoto et al. | 264/138 |
| 5,783,133 A | * | 7/1998 | Hara et al. | 264/261 |
| 6,004,498 A | * | 12/1999 | Fujii et al. | 264/255 |

* cited by examiner

*Primary Examiner*—Angela Ortiz
(74) *Attorney, Agent, or Firm*—Warner Norcross & Judd LLP

(57) ABSTRACT

A process for forming an injection molded article including multiple appliques. The process generally includes the steps of: positioning in a mold a first applique including a edge; positioning in the mold a second applique including a terminating end; abutting the second terminating end against the edge in a non-overlapping, substantially perpendicular configuration; injection molding a thermoplastic resin around the appliques to form an article. Because the first and second appliques do not overlap, they will not separate from one another over the life of the injection molded article. Accordingly, multiple applique articles formed according to the process of the present invention maintain their structural integrity and are resistant to warping, peeling and/or separation of the appliques from one another.

14 Claims, 5 Drawing Sheets

MULTIPLE APPLIQUE PROCESS FOR INJECTION MOLDING ARTICLES

BACKGROUND

The present invention relates to injection molding and more particularly to a process for injection molding contoured articles having multiple appliques.

Currently many injection molded articles include appliques—colored and/or textured layers covering the articles for decorative or functional purposes. For example, in the automotive industry, interior trim and instrument panel controls include colored appliques to enhance the appearance of the automobile's interior.

Appliques typically include a finished surface to provide an aesthetic appearance, for example a wood grain, and an unfinished surface to provide an interface for bonding a structural resin to the applique.

Frequently, it is desirable to combine multiple appliques on a single interior trim panel to minimize the number of interior panels in a vehicle. For example, a panel surrounding a radio in a car may include two appliques; an aesthetic wood veneer applique on the most prominent portion of the panel, and a black matte applique adjacent the digital display of the radio to minimize reflections from the display.

Prior art multiple applique panels are formed by an injection molding process wherein appliques are overlapped in a mold and a structural thermoplastic resin is injected over and around the appliques. An example of this process is illustrated in FIG. 1 where one applique 104 is positioned in overlapping relation to another applique 102 between molds 110 and 112. Both appliques have finished surfaces 101, 105 and unfinished surfaces 103, 107. A resin 106 is injected into the mold cavity around the appliques so that it pushes applique 104 upward and adjacent to applique 102 in region 108. Subsequently, finished surface 105 overlaps unfinished surface 103. During injection molding the unfinished surfaces 103, 107 bond to the resin 106. After the injection molded plastic cools, a panel including appliques 102 and 104 and the resin layer 106 is removed from the molds 110 and 112.

Although the injection molding process of the prior art produces a multiple applique panel, it suffers a number of shortcomings. Most significantly, the region where the appliques overlap one another is prone to peeling, detaching, and warping, as illustrated in region 108 of FIG. 2. In this region, the unfinished surface 103 frequently detaches from the finished surface 105, and in some cases, to such a degree that a consumer may peel applique 102 away from applique 104. In warm, humid southern climates, the frequency of such defects is significantly increased. Of course, such defects lead to distorted and aesthetically displeasing automotive trim. At a substantial cost, the manufacturer of such trim typically has to replace the trim if the product is under warranty.

SUMMARY OF THE INVENTION

The aforementioned problems are addressed in the present invention that provides an injection molding process in which the edge of one applique is abutted against the finished surface of another applique adjacent to its edge so that the two appliques do not overlap when a thermoplastic resin is injection molded behind both appliques to form an article.

In a preferred embodiment, the present invention generally includes the steps of: providing a pair of appliques, each including a finished surface; abutting the edge of on applique against the finished surface of the other adjacent to the edge of that applique; and injection molding a resin or other chemically compatible material behind the appliques. Because the applique is abutted against the other adjacent to its edge, the finished and unfinished surfaces do not overlap in a formed article.

In a more preferred embodiment, the finished surface of one applique does not extend all the way to the edge of that applique so that the edge of that applique exposes only the unfinished layer. Thus, when abutting a finished layer of another applique against the edge, that finished layer contacts only the unfinished layer exposed along the edge.

The present inventive process provides a simple and cost-effective way to combine multiple appliques into a variety of injection molded articles such as instrument panels, automotive trim panels, furniture, appliance exteriors, construction materials, computer housings, containers, and the like. Because of the innovative process, completed articles do not include any regions where the finished layer of one applique overlaps the unfinished layer of another applique; the end of an applique merely abuts an edge of another applique. Thus, the resultant article is not prone to peeling, detaching, or warping of overlapping applique layers. In addition, the use of an applique having a finished surface that does not extend to the edge prevents abutting appliques from peeling or tearing the finished surface away from the applique during or after the injection molding process.

These and other objects, advantages and features of the invention will be more readily understood and appreciated by reference to the detailed description of the preferred embodiments and the drawings.

DETAILED DESCRIPTION OF THE PREFERRED EMBODIMENT

Figure 1:
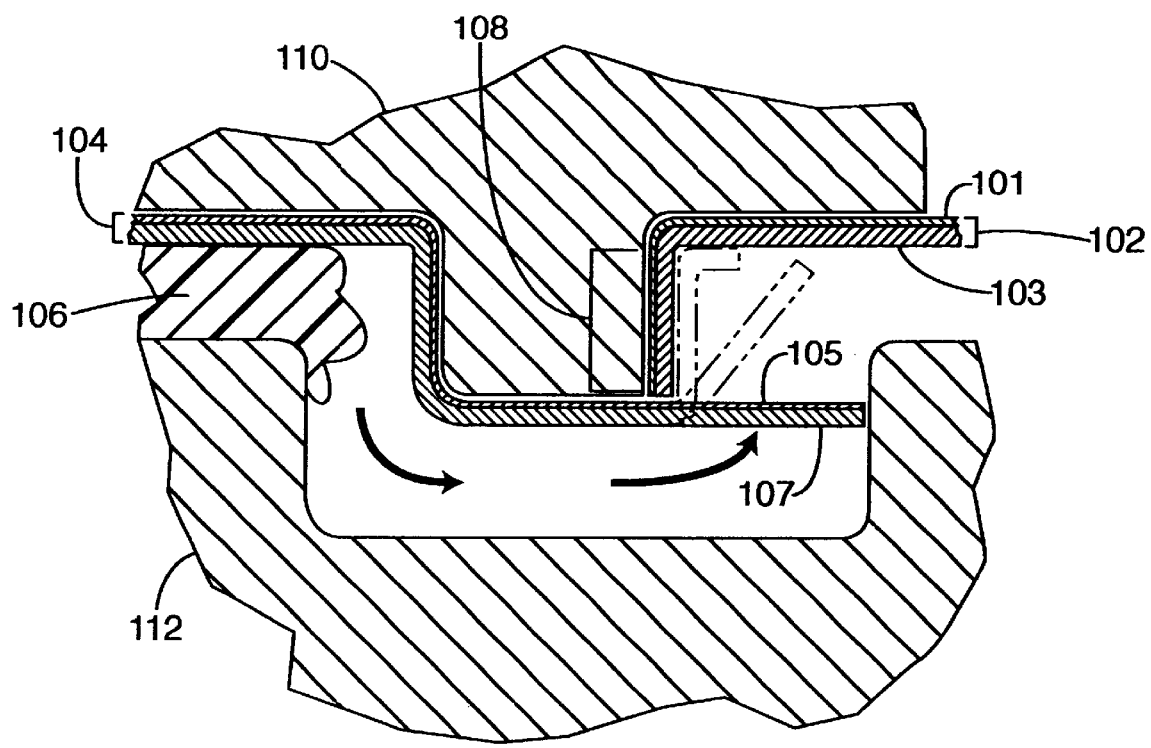
FIG. 1 is a section view of an injection molding process of the prior art.
Figure 2:
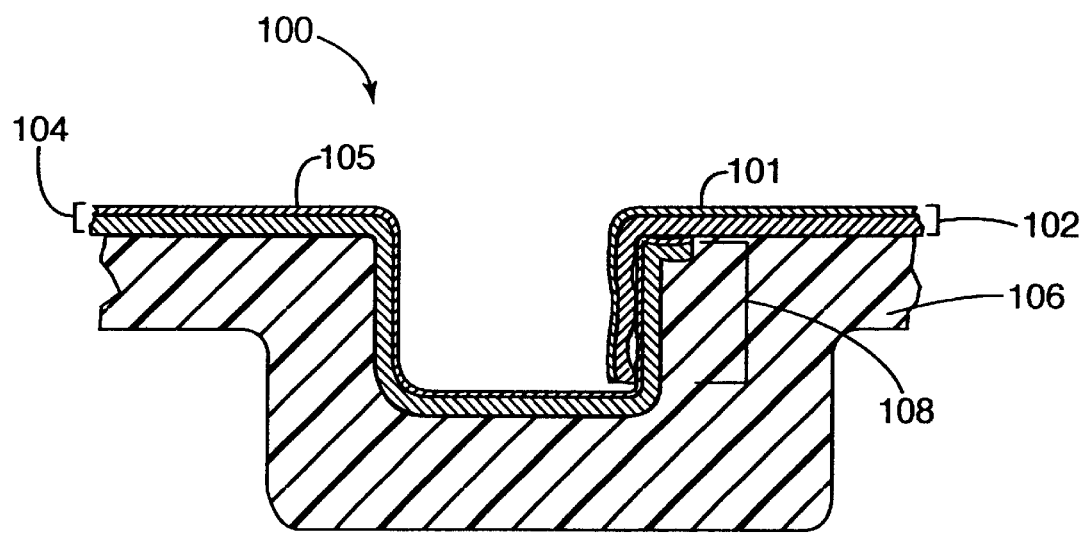
FIG. 2 is a section view of a defective injection molded panel of the prior art.
Figure 3:
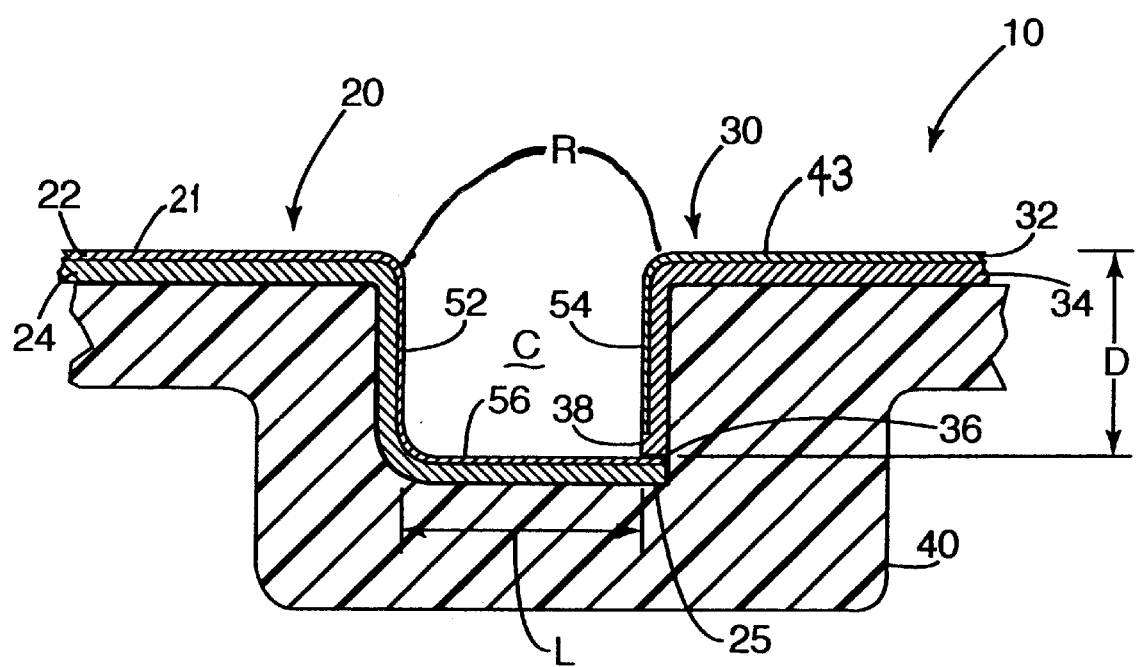
FIG. 3 is a section view of a panel molded with the process of the present invention.

In the preferred embodiment, the present invention is described in connection with the manufacture of thermoplastic interior trim panels for automobiles. With reference to FIG. 3, a portion of panel 10 manufactured according to the process of the present invention includes appliques 20 and 30 bonded to resin layer 40. Finished surface 21 at terminating end 25 of applique 20 abuts edge 36 of applique 30. Preferably, the appliques 20 and 30 abut one another in a substantially perpendicular configuration. As used herein, "abut" and its various forms, means positioning one material in contact with, against, adjacent to, or proximate to a portion of an edge or cross section of a second material. Preferably, the edge is located at a terminating end of that second material. As used herein, "applique" means any colored and/or textured, multi layered construction associated with articles for decorative or functional purposes.

The appliques 20 and 30 used in the present invention are preferably of different colors, patterns, and/or textures. For example, applique 20 may be colored like a wood veneer and applique 30 may be a black matte finish. Multiple appliques may be joined together in a single panel according to the present invention. Preferably, the appliques are joined in a groove, or channel, C as depicted to minimize the perceivable adjoinment of the appliques. The appliques may be joined at any corner where one terminating end may be abutted against the edge of another applique.

With reference to FIG. 3, the appliques 20 and 30 are preferably rounded at corners R to form sidewalls 52 and 54 of channel C. Sidewalls 52, 54 of are depth D that is greater than the radius of each of the corners R so that terminating end 36 does not disengage from abutting position with respect to terminating end 25 in injection molding process.

It is preferred that the minimum depth D is about 0.2 to about 1.0 millimeters greater than the preferred minimum radius of each of corners R, which is preferably about 0.1 to about 1.0 millimeters and more preferably about 0.5 millimeters. It is further preferred that the minimum length of bottom wall 56 is about 0.2 to about 1.0 millimeters. It will be appreciated with different materials such as metals and/or alloys, utilized in other aspects of the present invention, these dimensions may vary as the material allows. It will further be appreciated that the depths of sidewalls 52 and 54 may be different from one another, and radii of corners R may likewise be different from one another.

Appliques 20 and 30 are any commercially available multi-layer appliques. As indicated, in FIG. 3, for example, applique 30 preferably includes two layers, top layer 32 and substrate 34. Typically, top layer 32 is referred to as "top-coat" or "clear coat." This layer typically is decorative and may be hard and wear resistant as well. The exposed portions of the top layers 21, 43, are referred to as the "finished surfaces". The top layers may include a texture (not shown) or an ink or a colored plastic (not shown) therein or thereon to enhance the appearance of the applique as desired; in which case this top layer may be referred to as a decorative layer. A separate ink or plastic layer (not shown) may be disposed between the top layer 32 and the substrate 34. Optionally, the topcoat 32 may be clear and bonded to substrate 34 where the substrate is extruded in color.

The top layer of the preferred embodiment may be of any commercially available top coat material constructed from material including, but not limited to, a polyvinyl base, such as Thermark®, available from Avery Dennison Corporation of Pasadena, Calif.; acrylics; urethanes; polyvinyl fluorides, such as Tedlar®, available from E. I. du Pont de Nemours and Company of Wilmington, Del.; polyvinylidenes including polyvinylidene fluoride, such as Ensikem®, available from San Diego Plastics, Inc. of San Diego, Calif. and Avloy®, available from Avery Dennison; and any combination thereof or any other acceptable top coat material.

The top layers 22 and 32 are preferably bonded to the substrates 24, 34 using conventional laminating techniques. The substrates 24, 34 may be any commercially available thermoformable material including polycarbonate, acrylonitrile butadiene styrene (ABS), thermoplastic elastomer polyolefin (TPO), polypropylene, polyethylene, or any other suitable thermoformable material. The exposed portions 28, 37 of the substrates 24, 34, that is, the surfaces opposite the top layers 22, 32 are referred to as "unfinished surfaces."

Resin layer 40 is preferably any of the commercially available thermoformable materials used above for the substrates, or any other chemically compatible resin that will bond with the substrates in an acceptable manner. Preferably, the resin bonds to the unfinished surfaces 28, 37 of the substrates 24, 34. In a preferred embodiment, the resin is polypropylene or polyethylene and the substrate is TPO.

The substrates 24, 34 are preferably molded or bonded permanently to layer 40. It will be appreciated that the thermoplastics of the substrate 24, 34 and resin layer 40 are mutually fusable or bondable to one another, that is, they join and/or unite with one another and do not separate from one another during the life of the article in which they are incorporated.

In a preferred embodiment of the present invention depicted in FIG. 3, the appliques are abutted against or positioned immediately adjacent one another in a non-overlapping manner. As used herein "non-overlapping" means the appliques contact one another without the finished surface of one applique contacting the unfinished surface of another applique. Accordingly, the two appliques will not separate from one another and cause warping and/or aesthetic destruction of the molded article during the useful life of the article.

Figure 5:
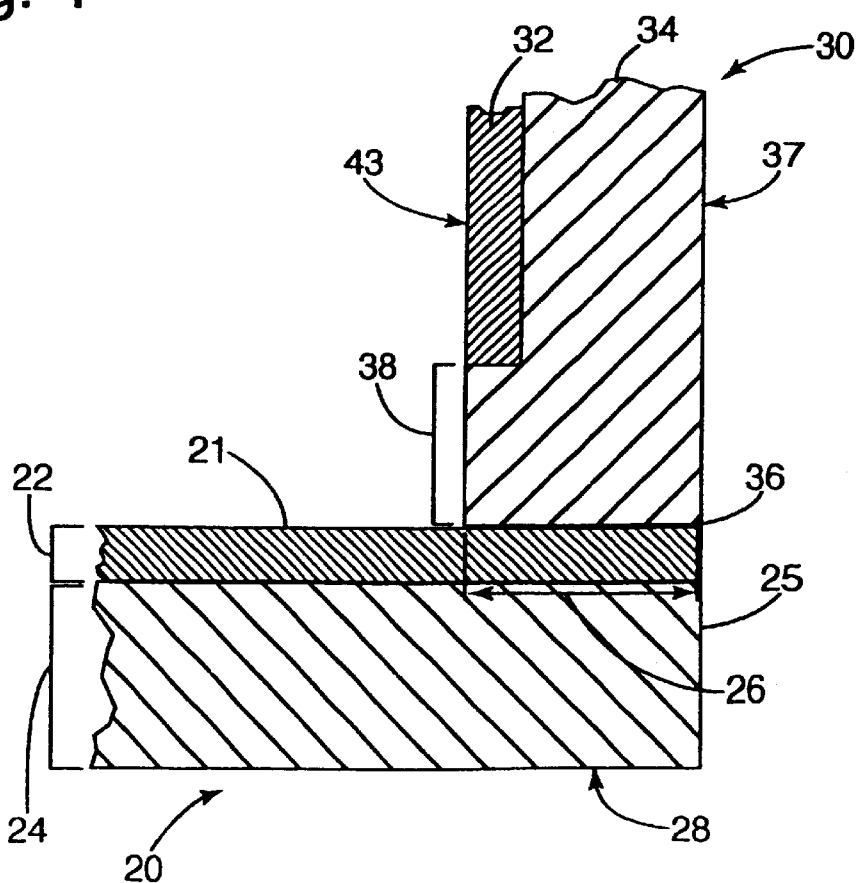
FIG. 5 is a section view of a first alternative embodiment of applique abutting ends.
Figure 9:
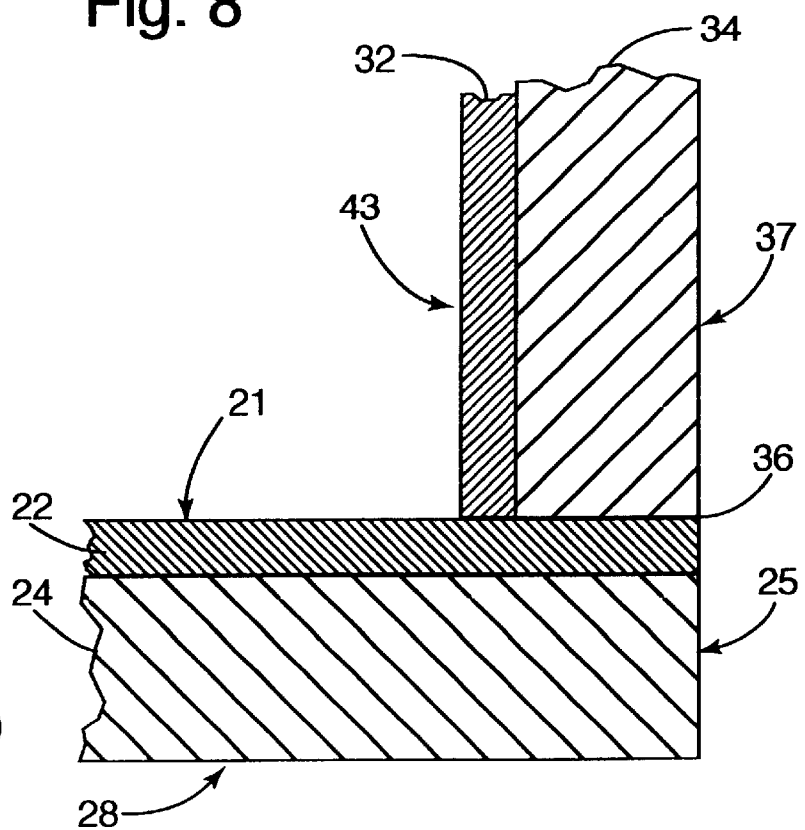
FIG. 9 is a section view of a third alternative embodiment of abutting applique ends.

FIGS. 3 and 5 depict a preferred configuration of applique 30. Top layer 32 ends a distance 38 from edge 36 and substrate 34 extends to edge 36. Optionally, the top layer 32 may extend to the edge 36 as depicted in FIG. 9. Alternatively, the terminating end 25 may abut against applique 30 along the finished surface 43 and the substrate 34 along distance 38 (not shown). This alternative embodiment may be implemented with the appliques 20 and 30 of FIG. 9 so that the terminating end 25 abuts against the finished surface 43.

Figure 7:
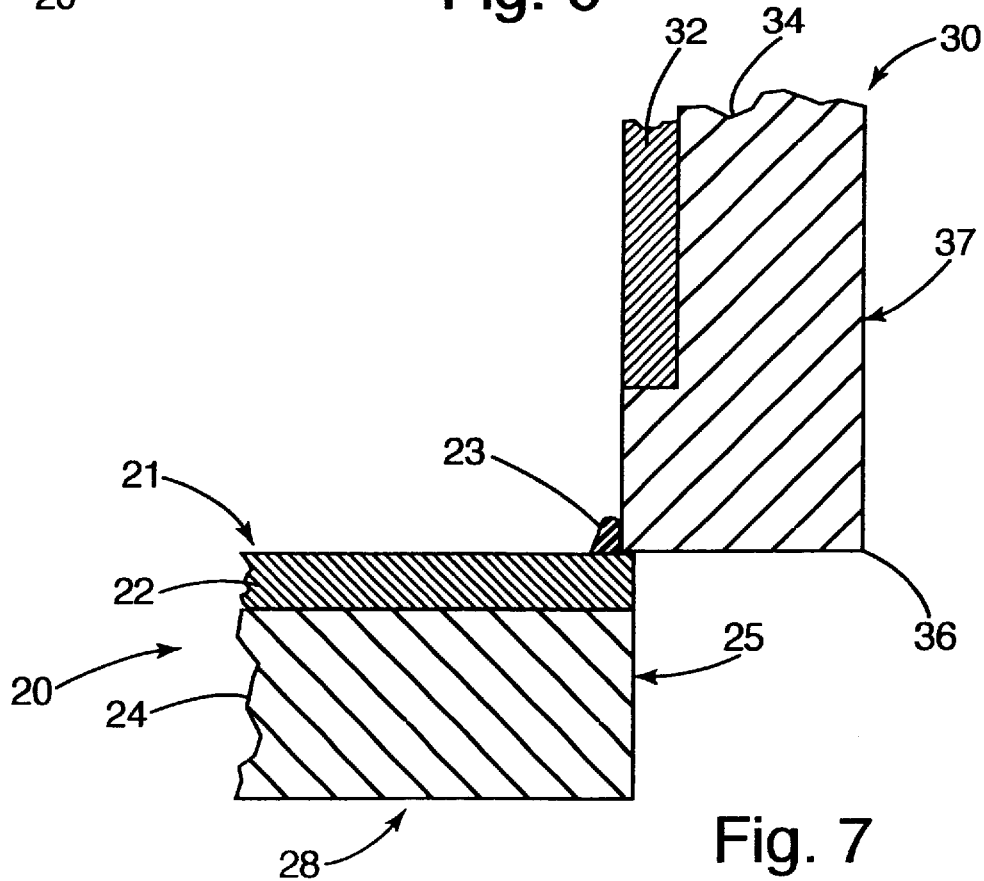
FIG. 7 is a section view of third embodiment of applique abutting ends.

As depicted in the preferred embodiment of FIG. 5, the appliques 20 and 30 abut against one another so that region 26 along the finished surface 21 is adjacent the edge, or terminating end, 36 of applique 30. As desired, the surface 26 may even be separated a small distance from the terminating end. With reference to FIG. 7, the finished surface 21 of top layer 22 optionally may include protrusion 23 of any shape or size to maintain the abutting configuration of the two appliques during injection molding or during the useful life of a resultant panel. This protrusion may be positioned on the top surface anywhere depending on the desired abutting configuration of the finished surface 21 against the cross section 36 of the applique 30.

As depicted in FIGS. 3 and 5, preferably the terminating end 36 is abutted with the surface 26 across the entire edge 36. This helps ensure that the terminating end 25 of applique 20 does not push up and past edge 36 in injection molding processes.

Optionally, however, as depicted in FIG. 7, the top surface 21 of applique 20 may overlap a portion of the cross section of edge 36 a minimal amount; specifically that amount that is necessary to prevent injection molded materials from passing between edge 36 and the finished surface 21 during injection molding.

Figure 6:
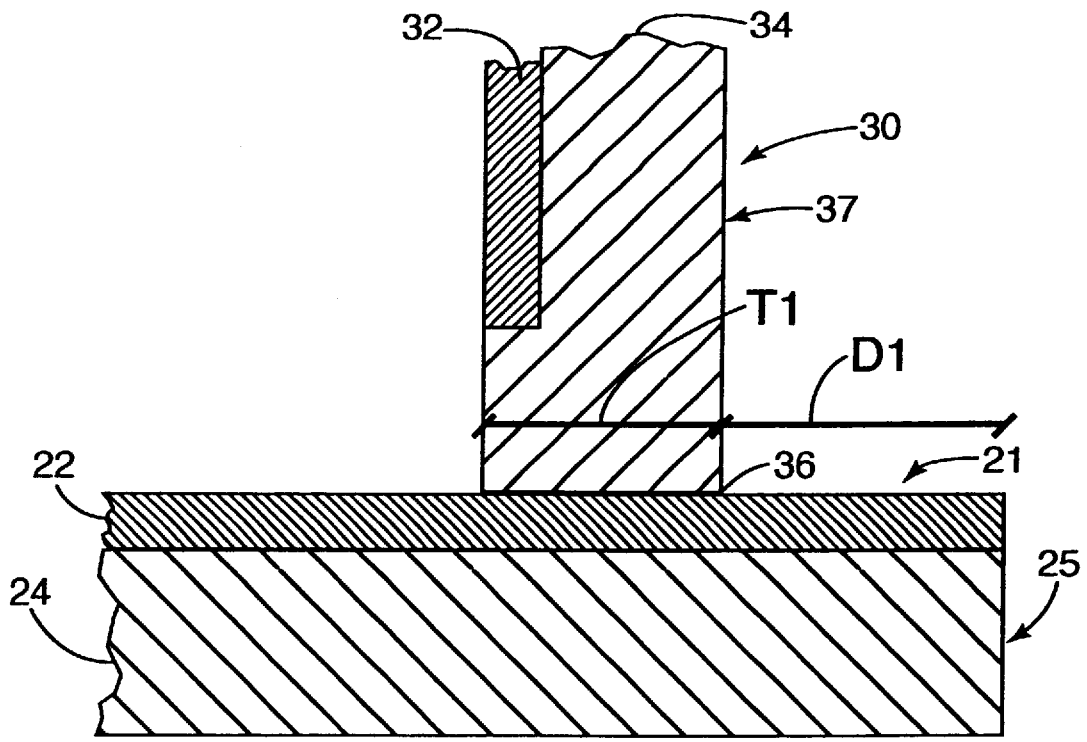
FIG. 6 is a section view of a second alternative embodiment of applique abutting ends.

In another alternative configuration depicted in FIG. 6, the appliques abut so that the terminating end 25 of applique 20 extends beyond the unfinished surface 37 a distance D1.

Preferably, the distance D1 is about equal to the depth or thickness T1 of the applique 30. However, the distance D1 may extend beyond unfinished surface 37 by any length provided that when a resin is injection molded over the substrates 24 and 34 finished surface 21 does not overlap unfinished surface 37, except for the overlap of fingers 27 on the unfinished surface 37 (FIG. 8).

Figure 8:
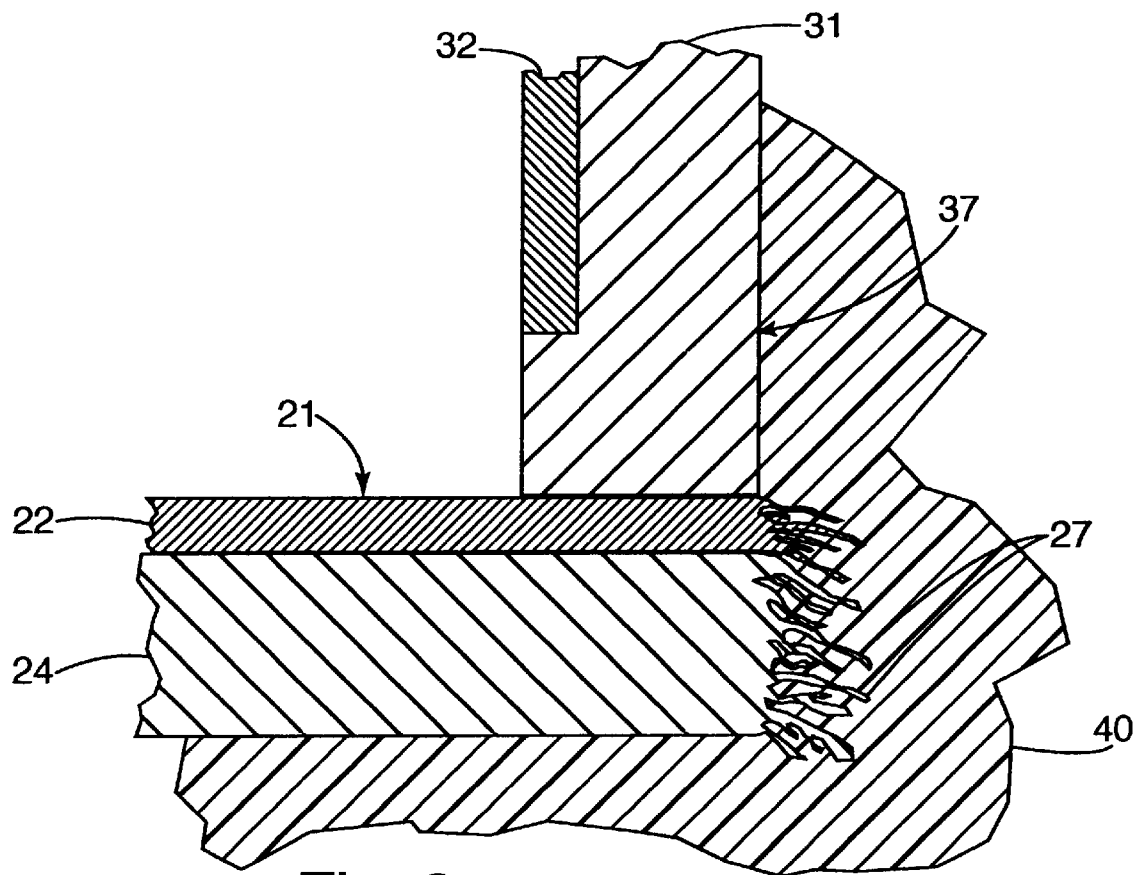
FIG. 8 is a section view of appliques bonded to a resin substrate.

With reference to FIG. 8, it will be appreciated that as resin layer 40 is injected over substrates 24 and 34 and/or comes into contact with top layers 22 and 32, these substrates and/or top layers may partially melt and form fingers 27 in the resin layer. Sometimes these minute fingers may come into contact with unfinished surface 37; however, this condition is not considered an overlap of the top layer on the unfinished surface 37.

Method of Manufacture

The preferred process of the present invention is used to injection mold an article including multiple appliques, for example, an instrument panel for an automobile described above. This process includes the steps: (1) providing a first applique including an edge; (2) abutting a second applique against the edge in a non-overlapping manner; and (3) injection molding a material over the first and second appliques to form an article that resists deformation due to separation of the first and second appliques from one another over the life of the article.

Figure 4:
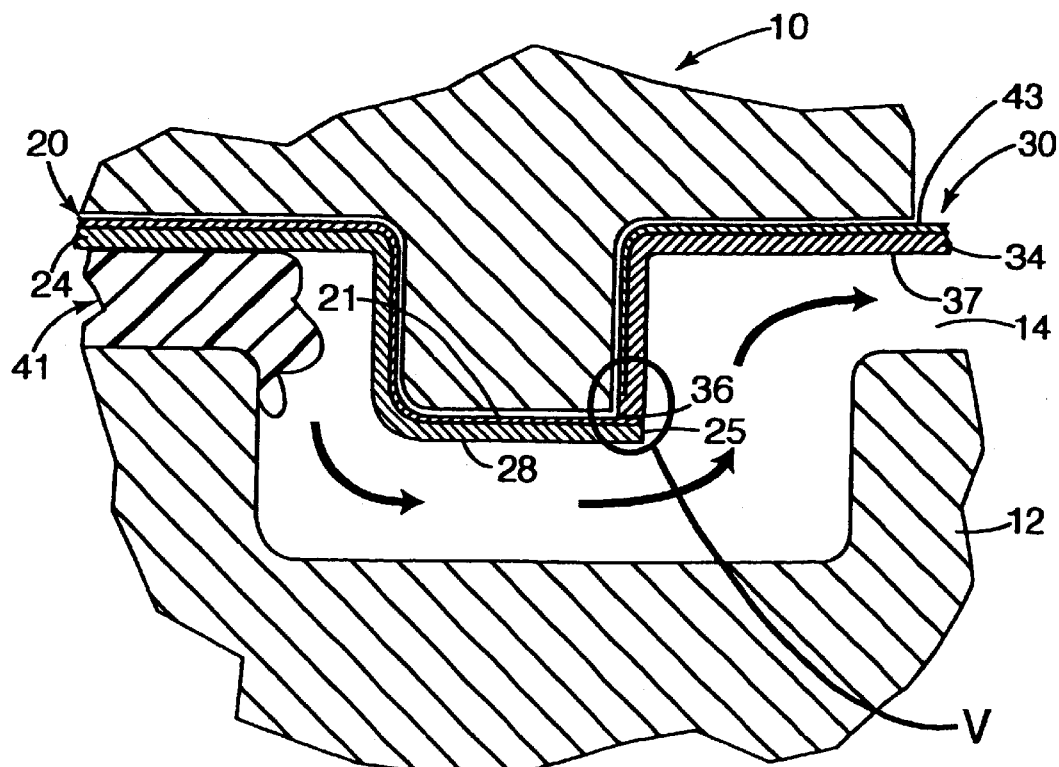
FIG. 4 is a section view of the injection molding process of the present invention.

With reference to FIG. 4, appliques 20 and 30 are positioned against mold 10. A thermoformable resin as described above in liquid form 41 is injected into the mold chamber 14 and flows through the chamber over the exposed unfinished surfaces 28 and 37 of appliques 20 and 30 in the direction of the arrows depicted. It is preferred that the resin flow in this direction so that terminating end 25 of applique 20 does not become pushed away from edge 36. The resin 41 bonds to the unfinished surfaces 28 and 37 of the appliques 20 and 30, respectively.

The appliques may be positioned in the mold in any abutting, non-overlapping configuration as explained above with reference to FIGS. 4–9. For example, with reference to FIGS. 4 and 5, in the mold, applique end 25 abuts edge 36 in a substantially perpendicular manner. A region 26 of the finished surface 21 is in contact with the edge 36. Optionally, the top layer 22, in particular the finished surface 21, need not be in contact with the entire edge or cross section 36; it may be in contact with only a portion of the edge 36 as depicted in FIG. 7. Moreover, the finished surface 21 may be at a slight angle and not abut entirely the edge 36, due to an imprecisely cut edge.

In another embodiment, depicted in FIG. 6, applique 20 may extend beyond the unfinished surface 37 in the mold a distance D1. This condition is acceptable as long as the finished surface 21 of top layer 22 does not overlap the unfinished surface 37, with the exception of finger 27 overlap (FIG. 8) as explained above.

Once the appliques 20 and 30 are positioned so they abut one another, as described above with reference to FIGS. 4–9, injection moldable resin is injected over the substrates 24 and 34 which are exposed to the interior chamber 14 of the mold (FIG. 4). When the resin is injected, portions of the appliques 20 and 30 may melt, forming fingers 27, as depicted in FIG. 8. This is of no consequence to the integrity of the injection molded article.

The resin readily bonds to the substrates 24 and 34 to form an article, preferably an automotive trim piece. The resin is allowed to cure, and then removed from the mold as a completed article. Once removed from the mold, the trim piece may then be further processed as desired.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A process for injection molding an article comprising the steps of:
   providing a first material including a first surface, a second surface opposite the first surface, a first edge, said first surface and said first edge forming a first corner edge;
   providing a second material including a third surface, a fourth surface opposite the third surface, and a second edge, said third surface and said second edge forming a second corner edge;
   abutting the first material against the second material with the first corner edge positioned immediately adjacent or contacting said second corner edge; and
   injection molding a third material over the first material and the second material to form an article, wherein the third surface is in non-overlapping relation with respect to the second surface in the formed article.

2. The process of claim 1 wherein said first surface and said third surface are finished and said second surface and said fourth surface are unfinished.

3. The process of claim 2 wherein said first material and said second material are abutted substantially perpendicular to one another.

4. The process of claim 1 wherein the first material is of a first depth and wherein the third surface abuts the first edge for a pre-selected distance that prevents the third material from escaping between the terminating end and the first edge during said injection molding step.

5. The process of claim 4 wherein the third surface abuts the first edge for a distance about equal to the first depth.

6. The process of claim 1 wherein each of the first material and the second material is a multiple layer applique.

7. The process of claim 4 wherein the first edge is disposed at an angle with respect to said third surface.

8. The process of claim 1 wherein the third surface includes a protrusion disposed proximate the first edge, the protrusion capable of maintaining the first material and the second material in a substantially perpendicular configuration.

9. A process for thermoforming an article comprising the steps of:
   providing a first applique including an edge, a first exposed surface and a first underside;
   providing a second applique including an end, a second exposed surface and a second underside;
   positioning the end proximate the edge, so that said second exposed surface abuts one portion of the edge and is at an angle to another portion of said edge;
   molding a formable material over said first underside and said second underside wherein said second exposed surface abutting said edge prevents the formable material from escaping between the end and the edge; and
   allowing the formable material to cure to form an article that resists deformation due to separation of the first and second appliques from one another over the useful life of the article.

10. The process of claim 9 wherein the edge exposes a cross section of the first applique having a depth and wherein the end is positioned adjacent the cross section for a distance substantially equal to the depth.

11. The process of claim 9 wherein the first appliqué is of a depth and the end extends beyond the first underside a distance about equal to the depth.

12. The process of claim 9 wherein the end extends beyond the first underside a distance selected so that the second exposed surface does not overlap the first underside after said molding step.

13. A process for forming an article having at least two appliques including the steps of:
   positioning a first applique of a depth and including a first terminating end in a mold;
   abutting a second applique adjacent the first terminating end so that a portion of the second applique extends beyond the first terminating end; and
   injection molding a material into the mold over the first and second appliques to form an article, wherein the portion of the applique extending beyond the first terminating end at least partially melts to form at least one melted finger in the material.

14. A process for injection molding an article comprising the steps of:
   providing a first material including a first surface, a second surface opposite the first surface and a first edge, said second surface and said first edge forming a first corner edge;
   providing a second material including a third surface, a fourth surface opposite the third surface, and a second edge, said third surface and said second edge forming a second corner edge;
   abutting the first material against the second material with the first corner edge positioned immediately adjacent or contacting said second corner edge; and
   injection molding a third material over the first material and the second material to form an article, wherein the third surface is in non-overlapping relation with respect to the second surface in the formed article and said second corner edge is separated a distance from said second surface.

* * * * *